United States Patent [11] 3,614,207

| [72] | Inventor | Heinrich Basista<br>Oberkochen, Germany |
| --- | --- | --- |
| [21] | Appl. No. | 37,993 |
| [22] | Filed | May 18, 1970 |
| [45] | Patented | Oct. 19, 1971 |
| [73] | Assignee | Carl Zeiss-Stiftung, d/b/a Carl Zeis Heidenheim (Brenz), Wuerttemberg, Germany |
| [32] | Priority | May 29, 1969 |
| [33] | | Germany |
| [31] | | P 19 27 278.7 |

[54] PHOTOGRAPHIC OBJECTIVE WITH CONTINUOUSLY VARIABLE FOCAL LENGTH
2 Claims, 4 Drawing Figs.

[52] U.S. Cl. .................................................... 350/184, 350/214
[51] Int. Cl. ................................................ G02b 15/14
[50] Field of Search ........................................ 350/184, 186

[56] References Cited
UNITED STATES PATENTS
3,457,003  7/1969  Macher ........................ 350/184

Primary Examiner—John K. Corbin
Attorney—Singer, Stern & Carlberg

ABSTRACT: A photographic objective of variable focal length consisting of four axially aligned optical members, a first collective member, a second dispersive member, a third dispersive member and a fourth collective member, with an iris diaphragm between the third and fourth member and in which for the purpose of varying the focal length the second and third members are axially adjustable relatively to each other and to the collective member. The second axially adjustable member comprises a single dispersive lens standing along by itself. A predominantly chromatically effective cemented face is provided in the dispersive third member while the dispersive second member comprises a single lens.

PHOTOGRAPHIC OBJECTIVE WITH CONTINUOUSLY VARIABLE FOCAL LENGTH

The invention relates to photographic objectives of variable focal length.

This type of objectives comprise four axially aligned optical members of which the first one A possesses a collective power of refraction, the second member B a dispersive power of refraction, the third member C a dispersive power of refraction, and the fourth member D a collective power of refraction. A change in the focal length is effected by axially displacing the two dispersive members B and C along the optical axis of the objective relatively to each other and relative to the collective members A and D. The collective fourth member D comprises a lens having a collective power of refraction, a splitting cube and a multilens basic objective having a collective power of refraction. The splitting cube is arranged directly in front of an iris diaphragm in the optical path of the light rays and has the purpose to direct a portion of the beam of light to the finder arranged in the camera.

The object of the invention is to develop such a type of photographic objective for a size 4.22 · 5.69 mm.² with a small optical expenditure and to obtain at a relatively small length of construction and a small diameter of the front lens an expansion range of about $12 \geq f \geq 30$ mm. There are variable objectives known which have a similar construction of which the second member B is provided with a chromatically acting cemented face. The objectives of the present invention do not have this feature. In the objectives made in accordance with the invention the predominantly chromatically effective cemented face is arranged in the dispersive third member C, while the dispersive second member B comprises a single lens only.

In accordance with the present invention the refractive powers of the members B and C are so distributed that the variable air space $d_8$ in the wide angle position with respect to all other focal length adjustments is the largest. In this arrangement it is possible to obtain the required chromatic correction with a cemented face in the dispersive third member C. The displacement of the cemented face from the second member B into the third member C makes it, however, possible to obtain, in accordance with the present invention, a reduction in the exterior dimensions, namely of the front lens diameter and the length of the objective.

IN THE DRAWINGS

In an objective according to the following table I, all the above requirements are met. The described objective is corrected for the relative aperture $f:1.9$.

TABLE I

| Lenses | Radii, mm. | Thicknesses and separations, mm. | $n_d$ | $v_d$ |
|---|---|---|---|---|
| $L_I$ | $r_1 = +48.349$ | $d_1 = 6.0$ | 1.62299 | 58.06 |
| $L_{II}$ | $r_2 = -41.868$ | $d_2 = 1.2$ | 1.78470 | 26.08 |
|  | $r_3 = -149.63$ | $d_3 = \begin{Bmatrix} 1.70 \\ 9.75 \\ 17.80 \\ 22.40 \\ 24.70 \end{Bmatrix}$ |  |  |
| $L_{III}$ | $r_4 = +127.721$ | $d_4 = 1.0$ | 1.62041 | 60.33 |
|  | $r_5 = +18.171$ | $d_5 = \begin{Bmatrix} 18.14 \\ 10.86 \\ 5.10 \\ 3.03 \\ 2.50 \end{Bmatrix}$ |  |  |
|  | $r_6 = -14.853$ |  |  |  |
| $L_{IV}$ | $r_7 = +18.171$ | $d_6 = 0.8$ | 1.51742 | 52.20 |
| $L_V$ | $r_8 = -262.27$ | $d_7 = 2.0$ | 1.71736 | 29.51 |
|  |  | $d_8 = \begin{Bmatrix} 8.36 \\ 7.59 \\ 5.30 \\ 2.77 \\ 1.00 \end{Bmatrix}$ |  |  |
| $L_{VI}$ | $r_9 = +20.982$ | $d_9 = 2.3$ | 1.62041 | 60.33 |
|  | $r_{10} = -64.938$ | $d_{10} = 0.7$ |  |  |
| $L_{VII}$ | $r_{11} = \infty$ | $d_{11} = 6.0$ | 1.51680 | 64.17 |
|  | $r_{12} = \infty$ | $d_{12} = 5.2$ | (Diaphragm Space) |  |
| $L_{VIII}$ | $r_{13} = +8.9123$ | $d_{13} = 2.7$ | 1.71300 | 53.83 |
|  | $r_{14} = -95.029$ | $d_{14} = 0.4$ |  |  |
| $L_{IX}$ | $r_{15} = -20.241$ | $d_{15} = 3.2$ | 1.78470 | 26.08 |
|  | $r_{16} = +8.534$ | $d_{16} = 0.6$ |  |  |
| $L_X$ | $r_{17} = +18.171$ | $d_{17} = 2.4$ | 1.74400 | 44.77 |
|  | $r_{18} = -18.171$ |  |  |  |

The values in this table I for the variable air spaces $d_3$, $d_5$ and $d_8$ relate to the different positions of the respective members for the different focal lengths of the objective.

| $d_3$ | $d_5$ | $d_8$ | $f$ |
|---|---|---|---|
| 1.70 | 18.14 | 8.36 | 12.34 |
| 9.75 | 10.86 | 7.59 | 16.03 |
| 17.80 | 5.10 | 5.30 | 21.55 |
| 22.40 | 3.03 | 2.77 | 26.14 |
| 24.70 | 2.50 | 1.00 | 29.08 |

The focal lengths of individual members are:

$$f_A = +70.58$$

$$f_B = -34.27$$

$$f_C = -48.15$$

$$f_D = +15.61$$

Figure 1:
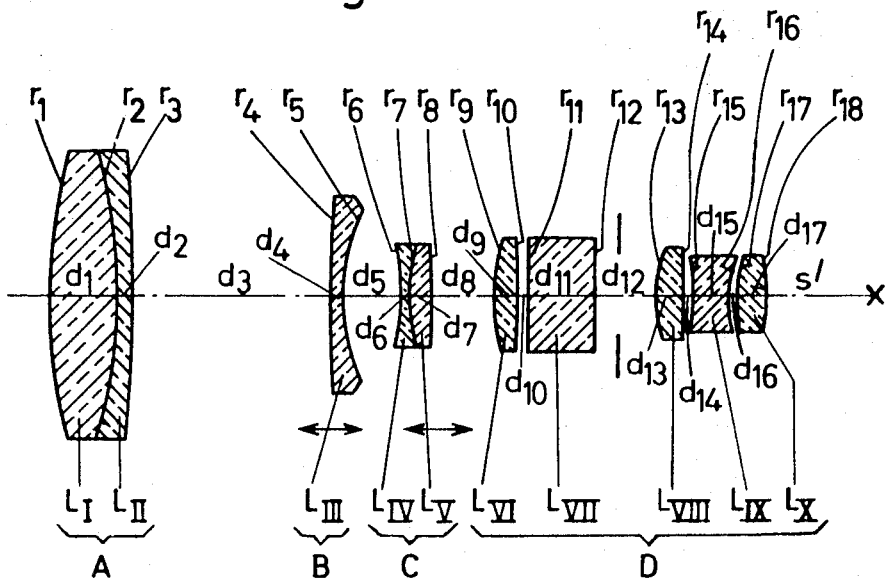
FIG. 1 illustrates diagrammatically in axial section an objective of the invention as given in table I in a position for $f=21.55$ mm.
Figure 2:
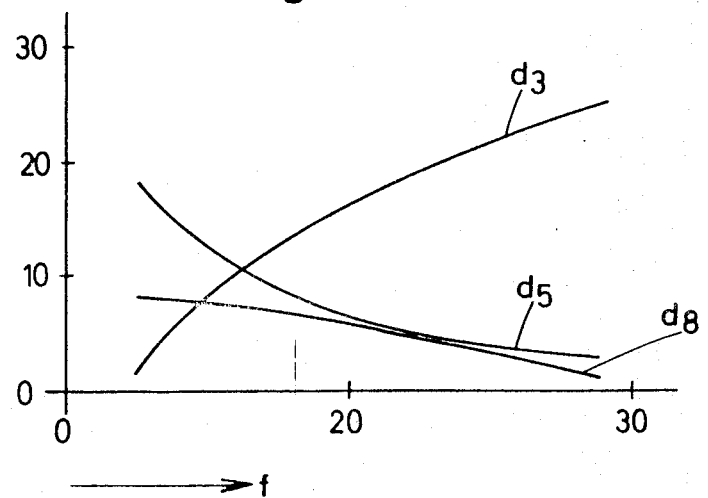
FIG. 2 is a graph illustrating the variable air spaced $d_3$, $d_5$ and $d_8$ in relation to the focal length $f$ of the objective.
Figure 3:
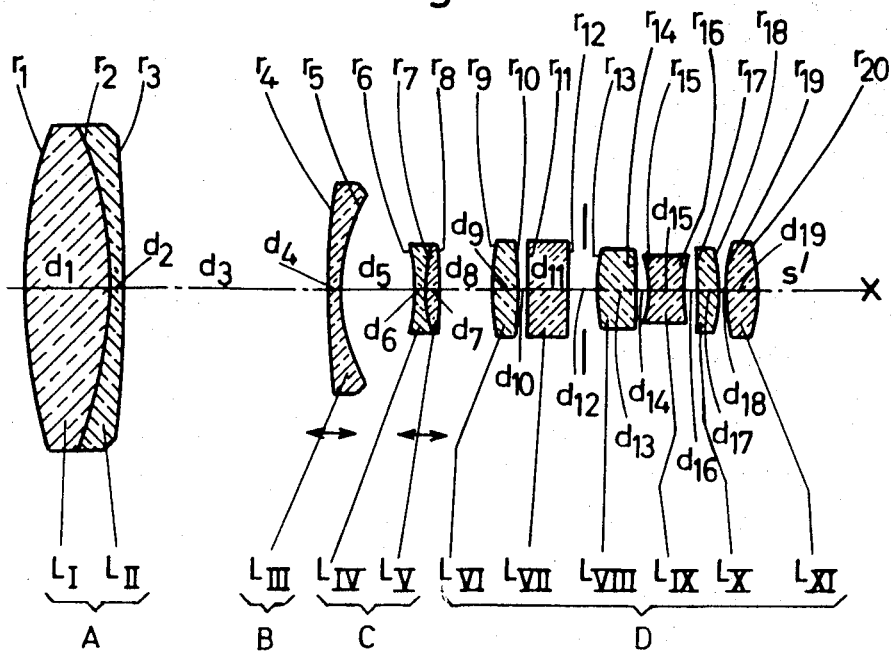
FIG. 3 illustrates diagrammatically in axial section an objective of the invention as given in table II in a position for $f=22.07$ mm.
Figure 4:
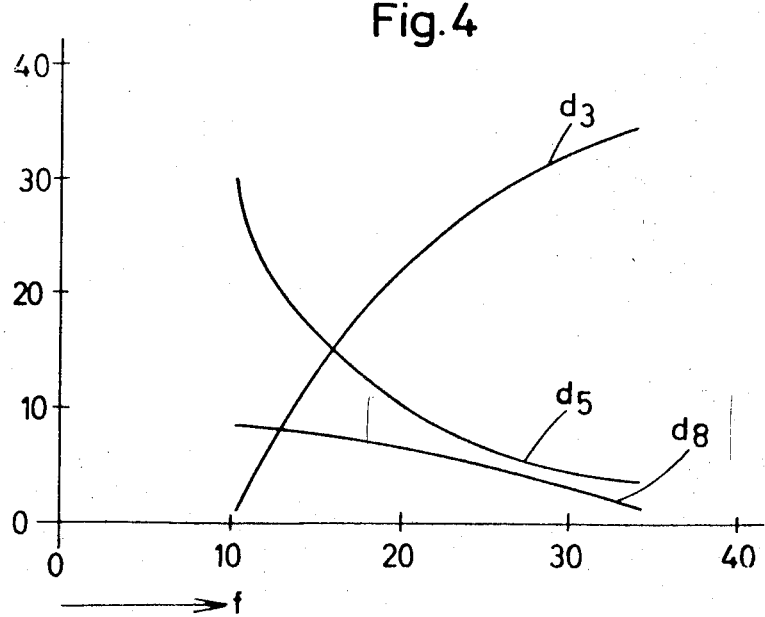
FIG. 4 is a graph illustrating the variable air spaces $d_3$, $d_5$ and $d_8$ in relation to the focal length $f$ of the objective shown in FIG. 3.

If one desires a greater expansion range and a larger relative aperture with a similar good condition of correction, it is recommended to employ a basic objective having four lenses. Such an objective is given in the following table II and illustrated in FIG. 3. It has an expansion range of $10 \leq f \leq 35$ mm. and is corrected for a relative aperture $f: 1.6$.

TABLE II

| Lenses | Radii, mm. | Thicknesses and separations, mm. | $n_d$ | $v_d$ |
|---|---|---|---|---|
| $L_I$ | $r_1 = +54,640$ | $d_1 = 10.0$ | 1.62280 | 56.90 |
| $L_{II}$ | $r_2 = -47.655$ | $d_2 = 1.6$ | 1.78470 | 26.08 |
|  | $r_3 = -170.342$ | $d_3 = \begin{Bmatrix} 0.8 \\ 12.606 \\ 24.411 \\ 31.157 \\ 34.531 \end{Bmatrix}$ |  |  |
| $L_{III}$ | $r_4 = +76.625$ | $d_4 = 1.2$ | 1.71300 | 53.83 |
|  | $r_5 = +19.112$ | $d_5 = \begin{Bmatrix} 29.906 \\ 18.500 \\ 8.679 \\ 4.670 \\ 3.500 \end{Bmatrix}$ |  |  |
| $L_{IV}$ | $r_6 = -15.849$ | $d_6 = 1.0$ | 1.71300 | 53.83 |
| $L_V$ | $r_7 = +14.642$ | $d_7 = 2.5$ | 1.78470 | 26.08 |
|  | $r_8 = -71.274$ | $d_8 = \begin{Bmatrix} 8.524 \\ 8.125 \\ 6.140 \\ 3.403 \\ 1.200 \end{Bmatrix}$ |  |  |
| $L_{VI}$ | $r_9 = +33.254$ | $d_9 = 3.0$ | 1.62041 | 60.33 |
|  | $r_{10} = -26.606$ | $d_{10} = 0.8$ |  |  |
| $L_{VII}$ | $r_{11} = \infty$ | $d_{11} = 5.0$ | 1.51680 | 64.17 |
|  | $r_{12} = \infty$ | $d_{12} = 3.3$ |  |  |
|  | $r_{13} = +18.564$ |  |  |  |

Table II—Continued

| Lenses | Radii, mm. | Thicknesses and separations, mm. | $n_d$ | $v_d$ |
|---|---|---|---|---|
| $L_{VIII}$ | $r_{14} = -62.194$ | $d_{13} = 5.0$ | 1.62041 | 60.33 |
|  |  | $d_{14} = 1.5$ |  |  |
| $L_{IX}$ | $r_{15} = -10.517$ | $d_{15} = 4.0$ | 1.80518 | 25.43 |
|  | $r_{16} = +16.669$ | $d_{16} = 1.5$ |  |  |
| $L_X$ | $r_{17} = -365.15$ | $d_{17} = 3.0$ | 1.62041 | 60.33 |
|  | $r_{18} = -12.959$ | $d_{18} = 0.1$ |  |  |
| $L_{XI}$ | $r_{19} = +24.758$ | $d_{19} = 4.0$ | 1.62041 | 60.33 |
|  | $r_{20} = -15.178$ |  |  |  |

The values given in this table II for the variable air spaces $d_3$, $d_5$ and $d_8$ relate to the different focal lengths of the objective.

| $d_3$ | $d_5$ | $d_8$ | $f$ |
|---|---|---|---|
| 0.80 | 29.906 | 8.524 | 10.25 |
| 12.606 | 18.500 | 8.125 | 14.58 |
| 24.411 | 8.679 | 6.140 | 22.07 |
| 31.157 | 4.670 | 3.403 | 29.19 |
| 34.531 | 3.500 | 1.200 | 34.30 |

The focal lengths of the individual members are:

$$f_A = +80.07$$

$$f_B = -36.03$$

$$f_C = -35.66$$

$$f_D = +23.10$$

In the tables I and II the lenses are designated with L, the radii with $r$, the axial thicknesses and air separations with $d$, the index of refraction with $n_d$, the Abbe numbers with $v_d$ for the $d$-line of the spectrum, and the distance between the rear lens and the image or intercept length with $s'$.

It should be noted that also other objectives whose finished data do not agree accurately with the values given in the above tables may possess a substantially similar good condition of correction, but it is recommended that the finished data conform as closely as possible to the data in these tables.

What I claim is:

1. A photographic objective with continuously variable focal length having four axially aligned optical members, a first collective member, a second dispersive member, a third dispersive member and a fourth collective member, in which the change of the focal length is effected by axially displacing the two dispersive members relatively to each other and relatively to said two collective members, wherein the improvement comprises that said second dispersive member consists of a single lens standing by itself, that said third dispersive member contains a predominantly chromatically effective cemented face, that the variable air space ($d_8$) between the third and fourth member in the wide angle position with reference to the other focal length positions is the largest and that the finished data of the objective comply substantially with the data given in the following table.

TABLE I

| Lenses | Radii, mm. | Thicknesses and separations, mm. | $n_d$ | $v_d$ |
|---|---|---|---|---|
| $L_I$ | $r_1 = +48.349$ | $d_1 = 6.0$ | 1.62299 | 58.06 |
| $L_{II}$ | $r_2 = -41.868$ | $d_2 = 1.2$ | 1.78470 | 26.08 |
|  | $r_3 = -149.63$ | $d_3 = \begin{cases} 1.70 \\ 9.75 \\ 17.80 \\ 22.40 \\ 24.70 \end{cases}$ |  |  |
| $L_{III}$ | $r_4 = +127.721$ | $d_4 = 1.0$ | 1.62041 | 60.33 |
|  | $r_5 = +18.171$ | $d_5 = \begin{cases} 18.14 \\ 10.86 \\ 5.10 \\ 3.03 \\ 2.50 \end{cases}$ |  |  |
| $L_{IV}$ | $r_6 = -14.853$ | $d_6 = 0.8$ | 1.51742 | 52.20 |
|  | $r_7 = +18.171$ |  |  |  |
| $L_V$ | $r_8 = -262.27$ | $d_7 = 2.0$ | 1.71736 | 29.51 |
|  |  | $d_8 = \begin{cases} 8.36 \\ 7.59 \\ 5.30 \\ 2.77 \\ 1.00 \end{cases}$ |  |  |
| $L_{VI}$ | $r_9 = +20.982$ | $d_9 = 2.3$ | 1.62041 | 60.33 |
|  | $r_{10} = -64.938$ | $d_{10} = 0.7$ |  |  |
| $L_{VII}$ | $r_{11} = \infty$ | $d_{11} = 6.0$ | 1.51680 | 64.17 |
|  | $r_{12} = \infty$ | $d_{12} = 5.2$ | (Diaphragm Space) |  |
| $L_{VIII}$ | $r_{13} = +8.9123$ | $d_{13} = 2.7$ | 1.71300 | 53.83 |
|  | $r_{14} = -95.029$ | $d_{14} = 0.4$ |  |  |
| $L_{IX}$ | $r_{15} = -20.241$ | $d_{15} = 3.2$ | 1.78470 | 26.08 |
|  | $r_{16} = +8.534$ | $d_{16} = 0.6$ |  |  |
| $L_X$ | $r_{17} = +18.171$ | $d_{17} = 2.4$ | 1.74400 | 44.77 |
|  | $r_{18} = -18.171$ |  |  |  |

2. A photographic objective with continuously variable focal length having four axially aligned optical members, a first collective member, a second dispersive member, a third dispersive member and a fourth collective member, in which the change of the focal length is effected by axially displacing the two dispersive members relatively to each other and relatively to said two collective members, wherein the improvement comprises that said second dispersive member consists of a single lens standing by itself, that said third dispersive member contains a predominantly chromatically effective cemented face, that the variable air space ($d_8$) between the third and fourth member in the wide angle position with reference to the other focal length positions is the largest and that the finished data of the objective comply substantially with the data given in the following table.

TABLE II

| Lenses | Radii, mm. | Thicknesses and separations, mm. | $n_d$ | $v_d$ |
|---|---|---|---|---|
| $L_I$ | $r_1 = +54.640$ | $d_1 = 10.0$ | 1.62280 | 56.90 |
| $L_{II}$ | $r_2 = -47.655$ | $d_2 = 1.6$ | 1.78470 | 26.08 |
|  | $r_3 = -170.342$ | $d_3 = \begin{cases} 0.8 \\ 12.606 \\ 24.411 \\ 31.157 \\ 34.531 \end{cases}$ |  |  |
| $L_{III}$ | $r_4 = +76.625$ | $d_4 = 1.2$ | 1.71300 | 53.83 |
|  | $r_5 = +19.112$ | $d_5 = \begin{cases} 29.906 \\ 18.500 \\ 8.679 \\ 4.670 \\ 3.500 \end{cases}$ |  |  |
| $L_{IV}$ | $r_6 = -15.849$ | $d_6 = 1.0$ | 1.71300 | 53.83 |
|  | $r_7 = +14.642$ | $d_7 = 2.5$ | 1.78470 | 26.08 |
| $L_V$ | $r_8 = -71.274$ | $d_8 = \begin{cases} 8.524 \\ 8.125 \\ 6.140 \\ 3.403 \\ 1.200 \end{cases}$ |  |  |
| $L_{VI}$ | $r_9 = +33.254$ | $d_9 = 3.0$ | 1.62041 | 60.33 |
|  | $r_{10} = -26.606$ | $d_{10} = 0.8$ |  |  |
| $L_{VII}$ | $r_{11} = \infty$ | $d_{11} = 5.0$ | 1.51680 | 64.17 |
|  | $r_{12} = \infty$ | $d_{12} = 3.3$ |  |  |
| $L_{VIII}$ | $r_{13} = +18.564$ | $d_{13} = 5.0$ | 1.62041 | 60.33 |
|  | $r_{14} = -62.194$ | $d_{14} = 1.5$ |  |  |
| $L_{IX}$ | $r_{15} = -10.517$ | $d_{15} = 4.0$ | 1.80518 | 25.43 |
|  | $r_{16} = +16.669$ | $d_{16} = 1.5$ |  |  |
| $L_X$ | $r_{17} = -365.15$ | $d_{17} = 3.0$ | 1.62041 | 60.33 |
|  | $r_{18} = -12.959$ | $d_{18} = 0.1$ |  |  |
| $L_{XI}$ | $r_{19} = +24.758$ | $d_{19} = 4.0$ | 1.62041 | 60.33 |
|  | $r_{20} = -15.178$ |  |  |  |